I

(12) United States Patent
Pasquero et al.

(10) Patent No.: US 8,710,967 B2
(45) Date of Patent: Apr. 29, 2014

(54) NON-VISUAL PRESENTATION OF INFORMATION ON AN ELECTRONIC WIRELESS DEVICE

(75) Inventors: Jerome Pasquero, Kitchener (CA); David Ryan Walker, Waterloo (CA)

(73) Assignee: BlackBerry Limited, Waterloo Ontario (CA)

( * ) Notice: Subject to any disclaimer, the term of this patent is extended or adjusted under 35 U.S.C. 154(b) by 357 days.

(21) Appl. No.: 13/110,489

(22) Filed: May 18, 2011

(65) Prior Publication Data

US 2012/0293311 A1 Nov. 22, 2012

(51) Int. Cl.
*G08B 6/00* (2006.01)
*G08B 3/00* (2006.01)

(52) U.S. Cl.
USPC ..... 340/407.1; 340/384.1; 340/4.1; 340/4.12; 340/4.14; 455/412.1; 455/412.2; 455/414.1; 455/414.4

(58) Field of Classification Search
USPC .......... 340/407.1, 384.1, 4.1, 4.12, 4.14; 455/412.1, 412.2, 414.1, 414.4
See application file for complete search history.

(56) References Cited

U.S. PATENT DOCUMENTS

| | | | |
|---|---|---|---|
| 7,363,060 B2 | 4/2008 | Bernhart et al. | |
| 7,439,872 B2 | 10/2008 | Hiltunen | |
| 2002/0156807 A1 | 10/2002 | Dieberger | |
| 2002/0161824 A1* | 10/2002 | Harris | 709/202 |
| 2006/0015560 A1 | 1/2006 | MacAuley et al. | |
| 2006/0168095 A1 | 7/2006 | Sharma et al. | |
| 2008/0033256 A1* | 2/2008 | Farhan et al. | 600/300 |
| 2008/0153464 A1 | 6/2008 | Morris | |
| 2008/0200149 A1 | 8/2008 | Zinn | |
| 2008/0313292 A1* | 12/2008 | Forstall et al. | 709/206 |
| 2009/0013254 A1 | 1/2009 | Walker et al. | |
| 2009/0043499 A1* | 2/2009 | Endo et al. | 701/210 |
| 2009/0094283 A1* | 4/2009 | Baudisch et al. | 707/104.1 |
| 2010/0017489 A1 | 1/2010 | Birnbaum et al. | |
| 2010/0017759 A1 | 1/2010 | Birnbaum et al. | |
| 2010/0191463 A1 | 7/2010 | Berry et al. | |
| 2010/0198458 A1 | 8/2010 | Buttolo et al. | |
| 2010/0216433 A1 | 8/2010 | Storozuk | |

FOREIGN PATENT DOCUMENTS

| | | |
|---|---|---|
| EP | 1959651 | 8/2008 |
| EP | 2141569 | 1/2010 |
| WO | 2004071113 | 8/2004 |
| WO | 2004076975 | 9/2004 |

OTHER PUBLICATIONS

Examination Report dated Feb. 5, 2013 for European Patent Application No. 11166598.4.

(Continued)

*Primary Examiner* — Andrew Bee
(74) *Attorney, Agent, or Firm* — Jon A. Gibbons; Fleit Gibbons Gutman Bongini & Bianco PL

(57) ABSTRACT

In one example, information is presented to a user in a non-visual manner. In this example, a list of visually representable items defined by a beginning and at least one of dimension of time and space is accessed. Each of the visually representable items within the dimension is placed in one of a plurality of non-visual sensory categories. A non-visual sensory preview is rendered, in sequence for each item in the list, from the plurality of non-visual sensory categories.

14 Claims, 12 Drawing Sheets

(56) References Cited

OTHER PUBLICATIONS

Hudson, S., et al., "Electronic Mail Previews Using Non-Speech Audio," Conference Companion on Human Factors in Computing Systems Common Ground, Chicago '96, Jan. 1, 1996, pp. 237-238, XP55008150, DOI: 10.1145/257089.257299, IBSN: 978-0-89-791832-9.

Canadian Office Action dated Oct. 4, 2013 for Canadian Application No. 2,776,776.

* cited by examiner

| STATUS 202 | ATTACHMENT 208 | NON-VISUAL EVENT TYPE 222 | EVENT DURATION 228 | EVENT INTENSITY LEVEL 232 | ⋮ 200 |
|---|---|---|---|---|---|
| UNREAD 204 | YES 210 | VIBRATORY PULSE 224 | 0.25 SECS 230 | 5 234 | ⋮ |
| READ 206 | YES | N/A 226 | 0.25 SECS | N/A | ⋮ |
| UNREAD | NO 212 | VIBRATORY PULSE | 0.25 SECS | 1 236 | ⋮ |
| READ | NO | N/A | 0.25 SECS | N/A | ⋮ |
| ⋮ | ⋮ | ⋮ | ⋮ | ⋮ | ⋮ |

Rows: 214, 216, 218, 220

FIG. 2

| SCHEDULED CALENDAR EVENT | NON-VISUAL EVENT TYPE | EVENT DURATION | EVENT INTENSITY LEVEL | ⋮ |
|---|---|---|---|---|
| YES 304 | VIBRATORY PULSE 314 | 0.33 SECS PER 1 HOUR INTERVAL 320 | 5 326 | ⋮ |
| NO 306 | N/A 316 | 0.33 SECS PER 1 HOUR INTERVAL 322 | N/A | ⋮ |
| ⋮ | ⋮ | ⋮ | ⋮ | ⋮ |

FIG. 3

| ROUTING INSTRUCTION 402 | NON-VISUAL EVENT TYPE 408 | AUDITORY EVENT 414 | DURATION BETWEEN EVENTS 420 | ... 400 |
|---|---|---|---|---|
| STRAIGHT 404 | AUDITORY EVENT 410 | "STRAIGHT" 416 | 0.25 SECS PER 1 KM | ... 422 |
| LEFT 406 | AUDITORY EVENT 412 | "LEFT" 418 | 0.25 SECS PER 1 KM | ... |
| RIGHT | AUDITORY EVENT | "RIGHT" | 0.25 SECS PER 1 KM | ... |
| DESTINATION | AUDITORY EVENT | "DESTINATION" | 0.25 SECS PER 1 KM | ... |
| ... | ... | ... | ... | ... |

NON-VISUAL PRESENTATION OF INFORMATION ON AN ELECTRONIC WIRELESS DEVICE

FIELD OF THE DISCLOSURE

The present disclosure generally relates to electronic devices, and more particularly to presenting information to a user on an electronic device.

BACKGROUND

Information is generally presented to a user on an electronic device, such as a wireless communication device, in a visual manner. Stated differently, information is displayed to a user via the display of the device. However, there are many instances where a user is not able to look at the display long enough to fully comprehend the information being displayed. Some electronic devices allow information on the display to be read back to the user using text-to-speech software. However, this text-to-speech option is usually slow and sometimes incomprehensible. Also, the user may need to be presented with the information in a more indiscrete and unobtrusive manner.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIGS. 2-4 illustrate various examples of non-visual presentation profiles, in accordance with one example;

DETAILED DESCRIPTION

As required, detailed embodiments are disclosed herein. However, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e. open language). The term "coupled" as used herein, is defined as "connected" although not necessarily directly, and not necessarily mechanically.

The term "wireless communication device" is intended to broadly cover many different types of devices that can wirelessly receive signals, and in most cases can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop/computer, a personal digital assistant, a tablet computing device and other similar devices.

Described below are systems and methods for non-visually presenting information to a user of an electronic device. In one example, a list of visually representable items defined by a beginning and at least one of dimension of time and space is accessed. Each of the visually representable items is placed within the dimension in one of a plurality of non-visual sensory categories. A non-visual sensory preview from the plurality of non-visual sensory categories is rendered in sequence for each item in the list. This non-visual sensory preview of the information provides ambient global information to the user in an unobtrusive way. Stated differently, the non-visual sensory preview provides information to a user that can be processed in a conscience or subconscious way.

Figure 1:
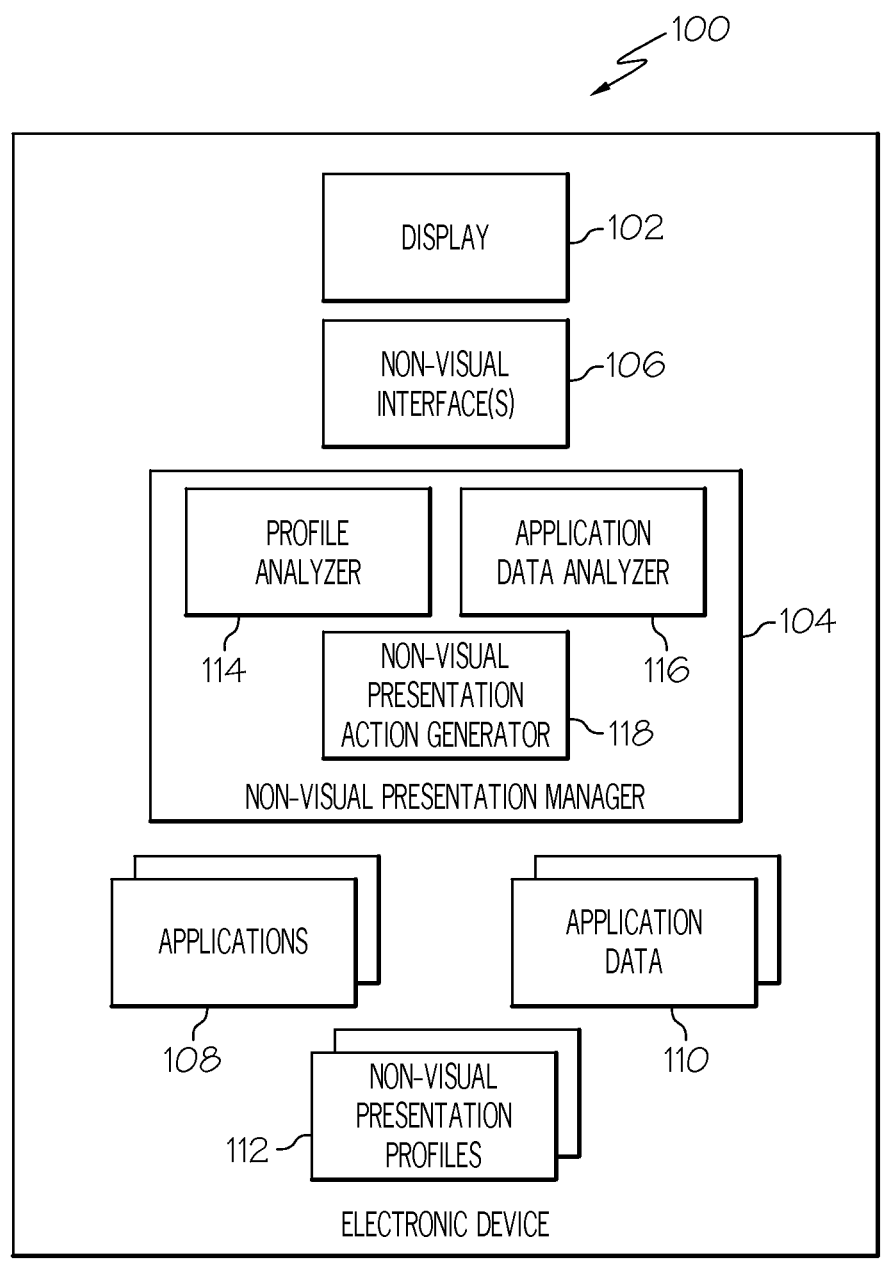
FIG. 1 is a block diagram of an operating environment, in accordance with one example.

FIG. 1 is a block diagram illustrating one example of an operating environment for presenting information to a user of an electronic device in a non-visual manner. In particular, FIG. 1 shows an electronic device such as, but not limited to, a wireless communication device 100. It should be noted that although the following discussion uses a wireless communication device as one example of an electronic device, any electronic device that presents information to a user is applicable to one or more examples of the present invention. The wireless communication device 100 comprises, among other things, a display 102, a non-visual presentation manager 104, one or more non-visual interfaces 106, applications 108, application data 110 (also referred to herein as "visually representable item 110"), and non-visual presentation profiles 112. The applications 108 can be any application that generates information to be displayed to a user via the display 102. For example, the applications 108 can include, but are not limited to, a messaging application, a global positioning satellite (GPS) application, a calendar application, or the like.

The application data 110 comprises data/information generated or managed by the applications 108 to be displayed to the user via the display 102. For example, with respect to a messaging application, the application data 110 can include text messages, email messages, instant messages and information associated therewith. With respect to a GPS application, the application data 110 can include routing information/instructions or other related information. With respect to a calendar application, the application data 110 can include meeting/scheduling information and other related information. It should be noted that the application data 110 can also include data that is not necessarily visually displayed to a user but is used by an application to visually display information associated therewith. It should also be noted that the application data is not required to be currently displayed for the non-visual presentation manager 104 to analyze the data. The non-visual presentation manager 104 can analyze the application data 110 in a non-displayed state. The non-visual presentation profiles 112 identify the non-visual sensory type/category of non-visual sensory event/action or feedback that is to be generated by the non-visual presentation manager 104 for a given set of application data 110. The non-visual presentation profiles 112 are discussed in greater detail below.

The non-visual presentation manager 104 comprises a profile analyzer 114, an application data analyzer 116, and a non-visual sensory event/action generator 118. The non-visual presentation manager 104 utilizes these components to identify the information that is being presented on the display 102 (and any additional information outside of the display area) and to generate non-visual feedback for presenting this information to the user in a non-visual manner via the one or more non-visual interfaces 106. The non-visual interfaces 106 can include any non-visual interface such as a tactile interfaces, haptic interfaces, audio interfaces, temperature varying interfaces, and the like. The non-visual presentation manager 104 and its components are discussed in greater detail below.

The non-visual sensory events/actions collectively create a pre-view or an overview of the information on the device 100 that is currently being displayed. In one example, the non-visual sensory events/actions are performed in a sequence that represents the sequence in which the application data 110 is visually presented to the user on the display 102. In addition, non-visual sensory events/actions can also be generated to create a pre-view or an overview of information that is outside of the display area (e.g., not currently being displayed). For example, non-visual sensory events/actions, such as a sequence of vibratory pulses either on the display 102 or throughout the device 100, can be generated to represent email messages shown on the display 102 and outside of the current display view. Vibratory pulses of different lengths and of different intensities can be used to represent various dimensions, such as time and/or space, associated with the information. For example, an unread email message can be represented by a vibratory pulse of a given length and/or a given intensity while a read email message can be represented by a vibratory pulse of a differently length and/or different intensity. Also, the time between pulses can represent the time elapsed between when the emails were received. Non-visual sensory event/action can include, but are not limited to, sound, haptic and/or tactile feedback, temperature, electric shock, and change in a shape.

It should be noted that other attributes in addition to length/duration and intensity can be varied to represent other attributes of information as well. It should also be noted that the term "pulse" is used throughout this discussion to denote any kind of brief tactile stimulation and is not restricted to being perceived as a pulse per se. The tactile stimulation can take one of many forms such as, but not limited to, vibration, pressure, indentation, temperature, change in size, change in shape, shock, etc.

FIG. 2 shows one example of a table 200 comprising various non-visual presentation profiles that are used by the non-visual presentation manager 104 for generating non-visual sensory events/actions for representing a set of application data 110. In particular, FIG. 2 shows one example of a table 200 associated with email messages. It should be noted that in the example of FIG. 2, each individual row in the table represents a separate profile for a given type of email message comprising the attributes shown in the table. However, other configurations are also applicable as well. The table 200 includes a first column 202, entitled "Status", that comprises one or entries that include an email message status identifier. For example, a first entry 204 under this column 202 comprises an "unread" status identifier and a second entry 206 comprises a "read" status identifier. It should be noted that other attributes of a message can be included as well such as, but not limited to, the type of message, importance of a message, flag type associated with message, or any other attribute applicable to messages.

A second column 208, entitled "Attachment", comprises entries with attachment status identifiers. For example, a first entry 210 under this column 208 comprises an attachment status identifier of "Yes" and a second entry 212 comprises an attachment status identifier of "No". Therefore, the first row 214 in the table 200 is a non-visual presentation profile for email messages that are unread and have an attachment. The second row 216 is a non-visual presentation profile for email messages that have been read and include an attachment. The third row 218 is a non-visual presentation profile for email messages that are unread and do not have an attachment. The fourth row 220 is a non-visual presentation profile for email messages that are have been read and do not have an attachment.

A third column 222, entitled "Non-Visual Event Type", comprises entries that indicate the type/category of non-visual sensory event to be generated for a given email message type. For example, a first entry 224 under this column 222 indicates that for an email message that is unread and has an attachment, a vibratory pulse is to be generated. A second entry 226 indicates that for an email message that is read and has an attachment, a non-visual sensory event is not generated. This configuration allows a user to easily distinguish between read and unread messages.

A fourth column 228, entitled "Event Duration", comprises entries that indicate a given duration for the event type/category identified in third column 222. For example, a first entry 230 under this column 228 indicates that the duration of the vibratory pulse for an email message that is unread and that has an attachment is 0.25 seconds long. A fifth column 232, entitled "Event Intensity", comprises entries that identify the intensity level (if applicable) of a given presentation event type/category identified in the third column 222. For example, a first entry 234 under this column 232 indicates that the vibratory pulse for an email message that is unread and that has an attachment is to be generated at a level 5 intensity. A second entry 236 indicates that the vibratory pulse for an email message that is unread and that does not have an attachment is to be generated at a level 1 intensity. The various intensity levels, in this example, allow the user to distinguish between unread messages with attachments and without attachments.

It should be noted that other configurations of presentation event types, durations, and intensity levels, in additional to those shown in FIG. 2, are also applicable as well. For example, email messages that have already been read can have a non-visual sensory event type/category associated therewith as well. This presentation event type/category can be the same as the event type/category for an unread email, but with a different duration and/or intensity. Alternatively, a different event type can be used as well. It should also be noted that one or more columns/rows can be added and/or deleted from the table shown in FIG. 2. One advantage is that presentation event types, event durations, and/or event intensities can be varied to allow a user to easily distinguish between different types of information such as an unread email with an attachment, an unread email without an attachment, a read email with an attachment, and a read email without an attachment in a non-visual manner.

FIG. 3 shows another example of a table 300 comprising non-visual sensory event profiles that are used by the presentation manager 104 for generating non-visual sensory events to represent a set of application data 110. In particular, FIG. 3 shows one example of a table 300 for calendar information. It should be noted that in the example of FIG. 3, each individual row in the table is a separate profile for a given type of calendar item. However, other configurations are also applicable as well. The table 300 includes a first column 302, entitled "Scheduled Calendar Event", which comprises entries identifying a scheduling status. For example, a first entry 304 under this column 302 identifies a profile that is applicable when a scheduled calendar item is detected for a given time period in a calendar application. A second entry 306 identifies a profile that is applicable when a "free" or "available" period is detected (i.e., a given time period is not associated with a scheduled calendar item). Therefore, the first row 308 in the table 300 is a non-visual presentation profile for scheduled calendar items and the second row 310 is a profile for calendar "free" time.

A second column 312, entitled "Non-Visual Event Type", comprises entries that indicate the type/category of non-visual sensory event to be generated for a detected scheduled calendar item or a detected "free" period. For example, a first entry 314 under this column 312 indicates that for detected scheduled calendar item a vibratory pulse is to be generated. A second entry 316 indicates that for a detected "free" period a non-visual event is not generated. This configuration allows a user to easily distinguish between time periods with scheduled calendar items and without scheduled calendar items. It should be noted that different types of calendar items can be associated with different types of non-visual sensory event types as well. For example, business related calendar items can be associated with different types of non-visual sensory events than personal related calendar items.

A third column 318 entitled "Event Duration" comprises entries that indicate a given duration for the non-visual sensory event type/category identified under the second column 312. For example, a first entry 320 under this column 318 indicates that the duration of the vibratory pulse for a scheduled calendar item is 0.33 seconds per 1 hour interval. A second entry 322 under this column 318 indicates that the duration of a time interval without a non-visual sensory event time is also 0.33 seconds per 1 hour interval. For example, if a scheduled meeting is 1 hour long, the vibratory pulse representing this meeting is 0.33 seconds long. If a scheduled meeting is 2 hours long, the vibratory pulse representing this meeting is 0.66 seconds long. The same applies for periods of "free" time.

A fourth column 324, entitled "Event Intensity", comprises entries that identify the intensity level (if applicable) of a given non-visual sensory event type identified in the second column 312. For example, a first entry 326 under this column 324 indicates that the vibratory pulse for a scheduled calendar event is to be generated at a level 5 intensity. It should be noted that other configurations of non-visual sensory event types, durations, and intensity levels in additional to those shown in FIG. 3 are also applicable as well. Also, one or more columns/rows can be added and/or deleted from the table shown in FIG. 3.

FIG. 4 shows another example of a table 400 comprising non-visual sensory event profiles that are used by the presentation manager 104 for generating non-visual sensory events to represent a set of application data 110. In particular, FIG. 4 shows one example of a table 400 for GPS routing information. It should be noted that in the example of FIG. 4, each individual row 424, 426, 428, 430 in the table is a separate profile for a given type of routing instruction. However, other configurations are also applicable as well. The table 400 includes a first column 402, entitled "Routing Instruction", which comprises entries identifying a given GPS routing instruction. For example, a first entry 404 under this column 402 identifies a "straight" routing instruction while a second entry 406 identifies a "left" routing instruction.

A second column 408, entitled "Non-Visual Event Type", comprises entries that indicate the type/category of non-visual sensory event to be generated for the corresponding routing instruction under the first column 402. For example, a first entry 410 under this column 408 indicates that for a "straight" routing instruction an auditory event is to be generated. A second entry 412 indicates that for a "left" routing instruction an auditory event is to also be generated. It should be noted that different non-visual sensory event types can be associated with different routing instructions as well.

A third column 414, entitled "Auditory Event", comprises entries that identify the specific auditory event to be presented to the user for the corresponding routing instruction under the first column 402. For example, a first entry 416 under this column 414 indicates that audio with the phrase "straight" is to be played to represent a "straight" routing instruction. A second entry 418 under this column 414 indicates that audio with the phrase "left" is to be played to represent a "left" routing instruction.

A fourth column 420, entitled "Duration Between Events", comprises entries that indicate a given delay between non-visual sensory events before presenting the next event. For example, a first entry 422 under this column 420 indicates that after a non-visual sensory event for a "straight" instruction is generated the manager 104 waits 0.25 seconds per 1 km before generating the next non-visual sensory event. Stated differently, if the user is to head straight for 10 km before turning left then there is a 2.5 second delay after generating the "straight" auditory event until the "left" auditory event is generated. This configuration gives the user an overview of the routing instructions and the distance that the user is to travel with respect to each instruction. It should be noted that vibratory pulses or other non-visual sensory events can be used instead of, or in addition to, the auditory events. For example, each routing instruction can be associated with a different vibratory pulse.

As can be seen from FIGS. 2-4 discussed above, various non-visual sensory events can be used to represent various types of information. These non-visual sensory events are advantageous because they can be used to provide a short overview or preview of the information in an unobtrusive non-visual manner that can be easily understood by the user. This short overview of preview of the information generated by the non-visual presentation manager 104 provides ambient global information to the user in an unobtrusive way. Stated differently, the non-visual presentation manager 104 provides information to a user that can be processed in a conscience or subconscious way.

Attributes associated with the non-visual sensory events such as duration and intensity can be selected and/or varied to represent time and/or space dimensions associated with information. For example, intensity levels can be varied such that a stronger intensity represents a point in time that is closer to the current time than an event with a weaker intensity. Intensity levels can also be varied to represent different types of information such as an email with an attachment and an email without an attachment. Duration of events and duration of the time between events can be varied such that events with a shorter delay between each other represent items that are closer to each other in space or time. For example, items on a web page that are close to each other can be represented by non-visual events with a smaller delay between each event, where items on the web page that are farther from each other can be represented by non-visual events with a longer delay between each event. In another example, a space dimension can be delimited by a scrollable window for viewing at least a portion of an email mailbox, where space dimension can be equal to viewable portion of the window or be greater or less than the viewable portion. In another example, the space dimension can be a position within a list of items, on a web page, or the like. These are only a few examples applicable to one or more examples of the present invention.

The non-visual presentation manager 104 uses the non-visual presentation profiles 112 to generate a sequence of non-visual sensory events that provide an overview or preview of a given set of information. For example, when the user of the device 100 opens an application 108 such as an email application, the application data analyzer 116 of the manager 104 analyzes the application data 110 such as email messages in an inbox. Alternatively, the process for non-visually representing information to a user can be initiated by the user placing a pointer over an icon without clicking the icon. The profile analyzer 114 of the manager 104 then identifies a set of profiles 112 such as those shown in FIG. 2 associated with email messages. The profile analyzer 114 then compares and matches the information in the identified profiles 112 to the corresponding data in the application data 110. As discussed above, these profiles 112 comprise a set of non-visual sensory types/categories of non-visual events that are associated with a given application data item. The non-visual sensory event generator 118, based on this comparison and matching, generates a sequence of non-visual events that represent the application data 110. The manager 104 then performs this sequence of non-visual sensory events to provide the user with an overview or preview of the application data/information 110.

Figure 5:
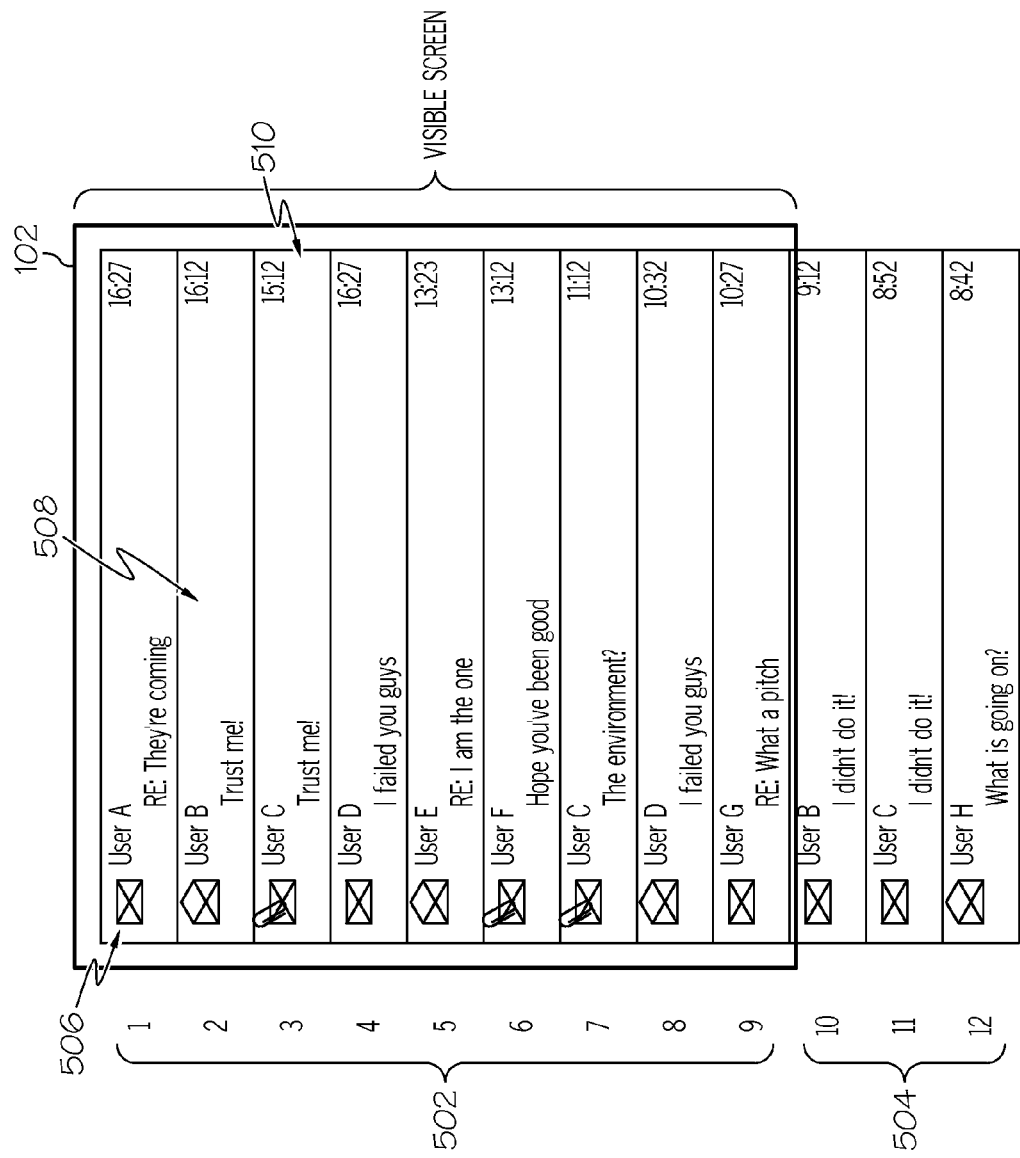
FIG. 5 shows one example of a list of email messages, in accordance with one example.

For example, FIG. 5 shows a first set of emails 502 being presented on the display 102 and a second set of email messages 504 that are outside of the current view of the display 102. The application data 110 in this example is the set of email messages 502, 504 in the inbox of the email application and a set of attributes associated with the email messages. The application data 110, in this example, is defined by a beginning, such as the first email in the set of emails to be non-visually presented, and by time and/or space dimension. The set of attributes can be, for example, message status such as read or unread, an indication as to whether the email comprises an attachment, the time the message was received (or other temporal attributes), or the like. The profile analyzer 114 compares this application data 110 to the set of profiles 112 to identify a profile (such as profiles 214, 216, 218, 220 in FIG. 2) associated with each message.

Using Table 200 in FIG. 2, the profile analyzer 114 identifies that the third profile 218 in table 200 is to be used for the first email message 506 in FIG. 5 since the first email message 506 is unread (as indicated by an icon of a closed envelope) and does not include an attachment (as indicated by the absence of a paper clip on the envelope icon). The profile analyzer 114 identifies that the fourth profile 220 in table 200 is to be used for the second email message 508 in FIG. 5 since it is has been read (as indicated by an icon of an open envelope) and does not include an attachment. The profile analyzer 114 identifies that the first profile 214 in table 200 is to be used for the third email message 510 in FIG. 5 since it is unread and has an attachment (as indicated by the presence of a paper clip on the envelope icon). The profile analyzer 114 continues this process for each email message in the first set of email messages 502 and optionally for each message in the second set of email messages 504.

Figure 6:
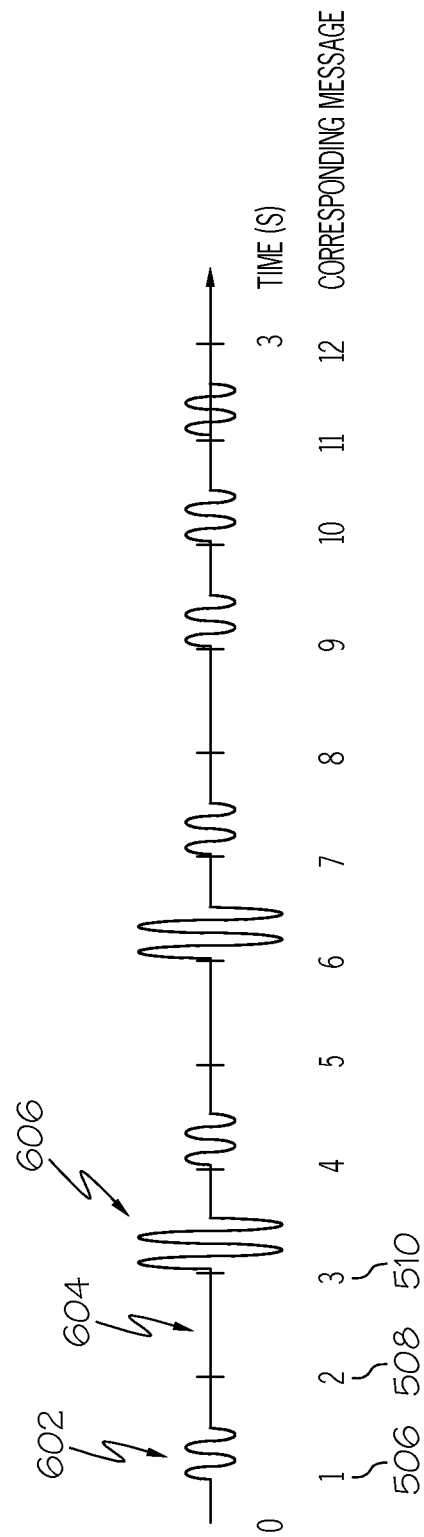
FIG. 6 shows one example of a sequence of non-visual sensory events representing the list of email messages of FIG. 5, in accordance with one example.

The non-visual sensory event generator 118 then generates a sequence of non-visual sensory events based on the identified profiles to create a non-visual overview/preview of the first set of email messages 502 and/or the second set of email messages 504. FIG. 6 shows one example of a sequence of non-visual events that represents and provides an overview/preview of the first and second set of email messages 502, 504 in FIG. 5. In particular, FIG. 6 shows that for the first email message 506 a first vibratory pulse 602 of 0.25 seconds is generated based on the information in the third profile 218 of FIG. 2. FIG. 6 also shows that a non-event period 604 of 0.25 seconds exists for the second email message 508 based on the information in the fourth profile 220 of FIG. 2.

A second vibratory pulse 606 of 0.25 seconds is generated for the third email message 510 based on the information in the first profile 214 of FIG. 2. However, because the third email message 510 has an attachment, the intensity of the second vibratory pulse 606 is greater than the first vibratory pulse 602 generated for the first email message 504. This difference in intensity is represented by the second vibratory pulse 606 having greater amplitude than the first vibratory pulse 602. The sequence continues for the remaining 9 email messages for a total direction of 3 seconds. As can be seen, the user is presented with an unobtrusive, efficient, and comprehensible non-visual overview/preview of email messages such that the user is able to distinguish between read messages, unread messages without an attachment, and unread messages with an attachment.

It should be noted that one or more examples of the present invention are applicable to any type of lists and are not limited to lists of email messages. For example, other types of lists include postings in a social network are applicable. In this example, the number comments associated with each posting can be represented with a non-visual preview, as discussed above. Another example of a list can include contacts where each contact has a network of his/her own contacts and the size of this network can be represented with a non-visual preview, as discussed above.

Figure 7:
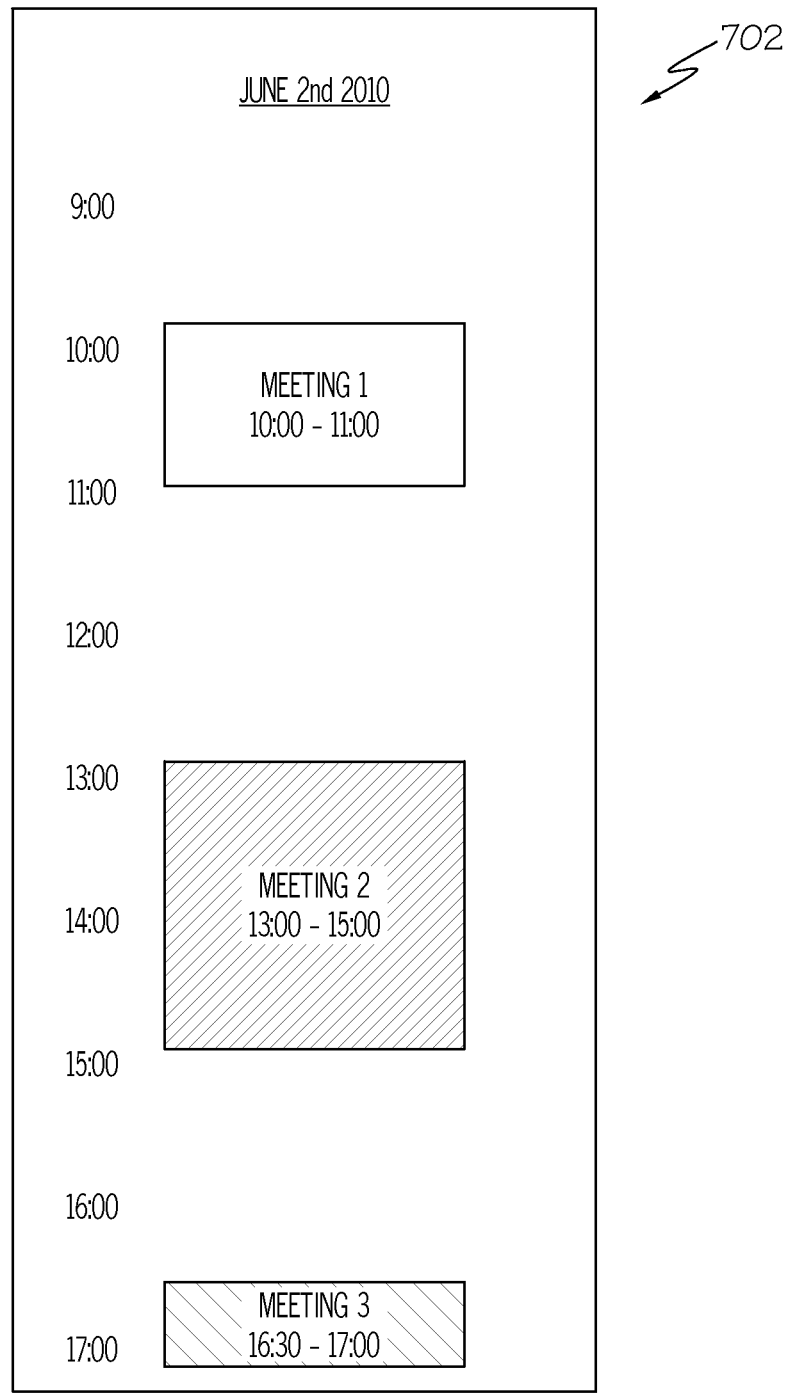
FIG. 7 shows one example of a list of calendar items, in accordance with one example.
Figure 8:
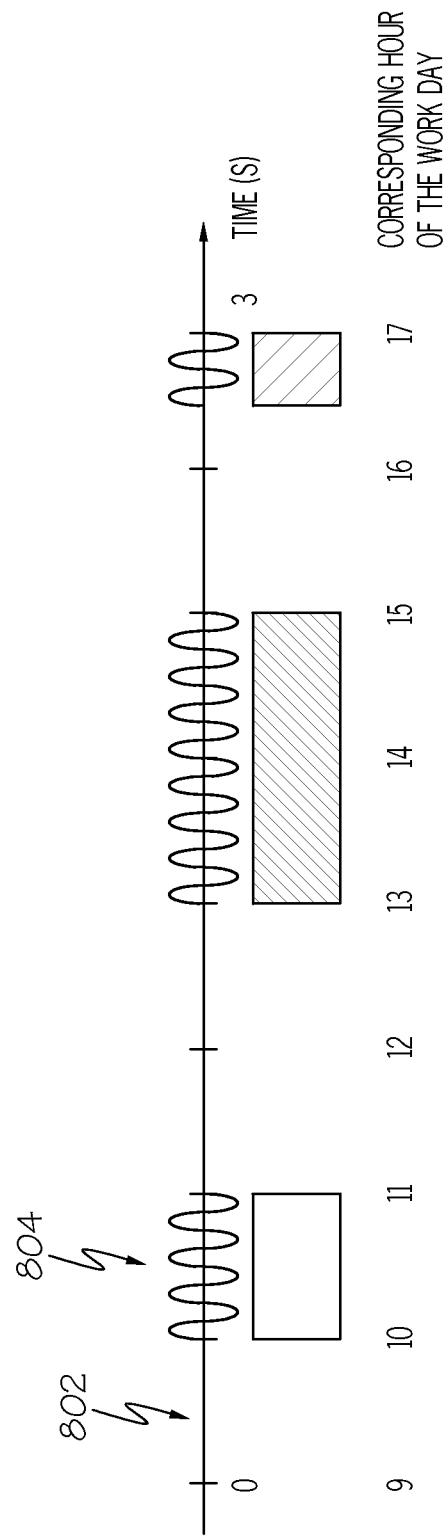
FIG. 8 shows one example of a sequence of non-visual sensory events representing the list of calendar items of FIG. 7, in accordance with one example.

Another example of generating a sequence of non-visual sensory events to for providing an overview/preview of displayed information is shown in FIGS. 7-8. FIG. 7 shows calendar information 702 being presented on the display 102. The application data 110 in this example is the set of calendar information 702 and optionally any attributes associated therewith. The profile analyzer 114 compares this application data 110 to the set of profiles 112 to identify a profile (such as profiles 308 and 310 in FIG. 3) associated with a calendar item.

Using Table 300 in FIG. 3, the profile analyzer 114 compares the calendar information at each time interval/slot to the profiles in table 300. For example, for the 9:00, 11:00, 12:00, 15:00, and 16:00 time slots the profile analyzer 114 determines that the second profile 310 is to be used since a calendar item is not present. However, the profile analyzer 114 determines that the first profile 308 is to be used for the time slot between 10:00-11:00, 13:00-14:00, and 16:30-17:00 since a calendar item exists for been scheduled for each of these slots.

The non-visual sensory event generator 118 then generates a sequence of non-visual events based on the identified profiles to create a non-visual representation of the calendar information 702. FIG. 8 shows one example of a sequence of non-visual events that represents and provides an overview/preview of the calendar information 702 in FIG. 7. In particular, FIG. 8 shows that a first relaxed period 802 (no event) corresponding to the time period of 9:00 to 10:00 exists for total of 0.33 seconds. This indicates that user is free during this time period. A first vibratory pulse 804 is then generated for a total of 0.33 seconds for the time period corresponding to 10:00 am to 11:00 am. This indicates that a meeting has been scheduled for one hour during this time period. The sequence then continues as shown in FIG. 8. As can be seen from FIG. 8, a user is presented with a non-visual overview of his/her calendar information 702 that allows the user to determine how many meetings he/she has and the duration of each meeting. It should be noted that, in one example, the length of the non-visual sensory preview shown in FIG. 8 corresponds to a ratio of a length of one of the calendar entries divided by a length of a time dimension corresponding to the time slots. In another example, the start time of rendering of the non-visual sensory preview corresponds to a ratio of a start time of the one of the calendar items divided by a length of the time dimension of the calendar. Also, even though the user may have opened the calendar in a "Month" view, the non-visual preview presented to the user can be for another period of time such as the current day. For example, the user can move a pointer over to a given day in the "Month" view and be provided a non-visual preview for that given day without opening a view for that specific day.

Figure 9:
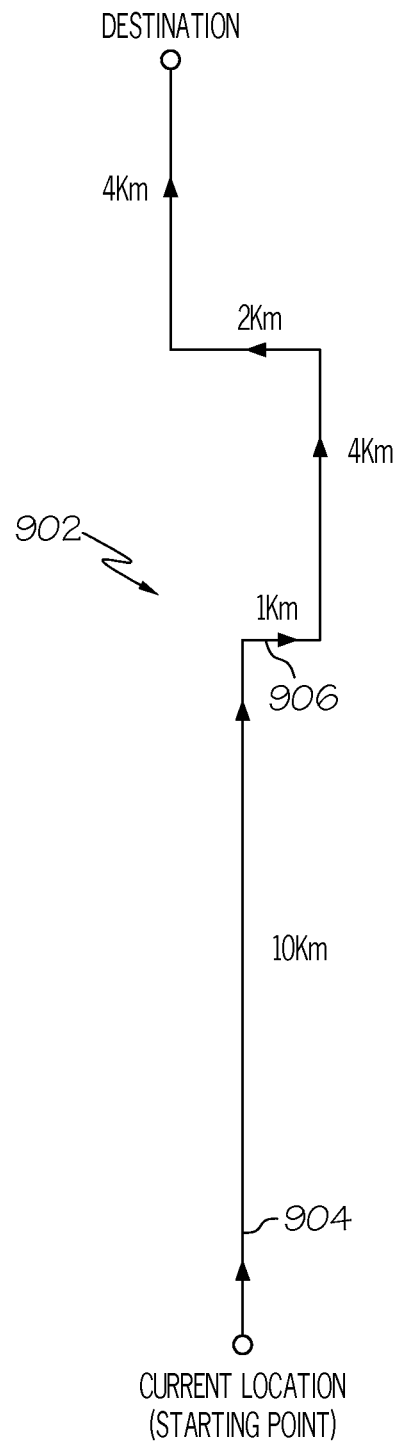
FIG. 9 shows one example of a list of routing instructions, in accordance with one example.
Figure 10:
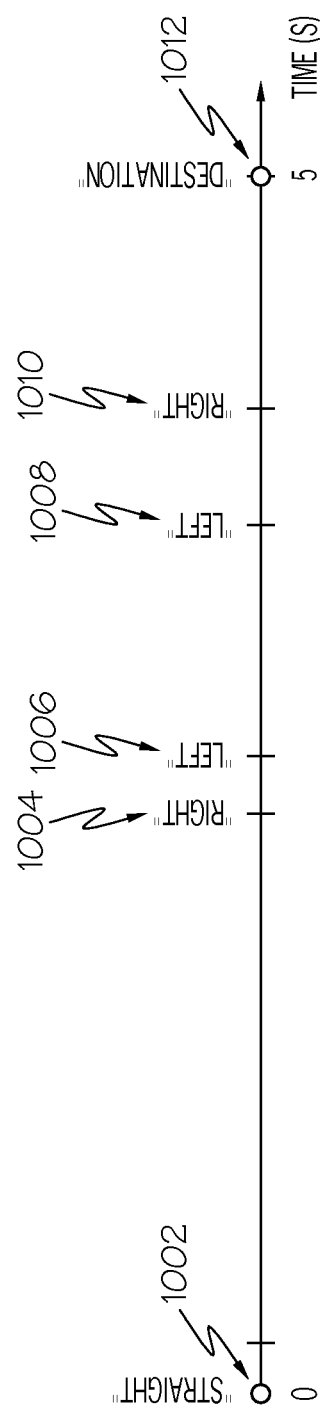
FIG. 10 shows one example of a sequence of non-visual sensory events representing the list of routing instructions of FIG. 9, in accordance with one example.

Another example, of generating a sequence of non-visual events to represent a given set of information is shown in FIGS. 9-10. FIG. 9 shows a set of GPS routing information 902 being presented on the display 102. For example, FIG. 9 shows that the user is to head straight for 10 Km then turn right for 1 Km, then turn left for 4 Km, then turn left for 2 Km, turn right for 4 Km. The application data 110 in this example is the set of calendar GPS routing information 902 and optionally any attributes associated therewith. The profile analyzer 114 compares this application data 110 to the profile 112 to identify a profile associated with calendar event.

Using Table 400 in FIG. 4 as an example, the profile analyzer 114 compares the GPS routing information 902 to the profiles in Table 400 and identifies the profiles to be used for each GPS routing instruction. For example, the profile analyzer 114 determines that the first profile 424 is to be used for the first instruction 904 of heading straight for 10 km. The profile analyzer 114 also determines that the third profile 426 is to be used for the second instruction 906 of turn right for 1 Km. The profile analyzer 114 performs this process for each of the remaining GPS instructions in FIG. 9.

The non-visual sensory event generator 118 then generates a sequence of non-visual events based on the identified profiles to create a non-visual representation of the GPS routing information 902. FIG. 10 shows one example of a sequence of non-visual events that represents and provides an overview/preview of the GPS routing instructions 902 in FIG. 9. In particular, FIG. 10 shows that a first non-visual event 1002 of audio with the phrase "straight" is presented to the user. The next event is not performed for another 2.5 seconds since the profile 424 indicates that the duration between events is for 0.25 seconds per 1 Km. Therefore, the user can determine that he/se is head straight for 10 Km. It should be noted the non-visual sensory preview shown in FIG. 10, in on example, corresponds to a ratio of a time of the direction entry divided by a length of time of the overall route described with each direction entry.

FIG. 10 also shows that a second non-visual event 1004 of audio with the phrase "right" is presented to the user and a delay of 0.25 second exists until the next event. Therefore, the user can determine that he/se is to turn right for 1 Km. A third non-visual event 1006 of audio with the phrase "left" is presented to the user and a delay of 1.0 seconds exists until the next event. Therefore, the user can determine that he/se is to turn left for 4 Km. A fourth non-visual event 1008 of audio with the phrase "left" is presented to the user and a delay of 0.5 seconds exists until the next event. Therefore, the user can determine that he/se is to turn left for 2 Km. A fifth non-visual event 1010 of audio with the phrase "right" is presented to the user and a delay of 1.0 seconds exists until the next event. Therefore, the user can determine that he/se is to turn right for 4 Km. A sixth non-visual event 1012 of audio with the phrase "destination" is presented to the user, which indicates that this is the last instruction of the GPS routing information 902. It should be noted that other forms of audio can be used to represent directions in an abstract manner. For example, instead of playing audio that states "left", "right", "straight", etc., any type of sound can be presented to the user to represent this information in an abstract manner. Also, the characteristics of the sounds such as frequency and amplitude can be varied to further represent a given set of application data.

As can be seen from the above discussion, the non-visual presentation manager 104 provides an overview/preview of information to a user of an electronic device using non-visual mechanisms. Users are provided with ambient global information in an unobtrusive way. The overview or overarching information that is communicated is subtle and can be processed by the user in a comprehensive way. The non-visual overview/preview can be automatically provided to the user upon launching an application and is designed to be presented to the user in an accelerated way.

For example, when unlocking the device 100 for the first time in the morning, the user is presented with a long string of faint tactile pulses that represent different meetings throughout the day. The approximate time and length of each meeting can be communicated in a non-visual manner. In another example, as soon as the destination address is entered into a GPS application or system, the system audibly presents an accelerated overview of the driving instructions. Alternatively, the instructions can be replaced with faint beeps that are used to indicate that some driving event will need to be taken without explicitly stating what the event will be. It should be noted that in examples where audio is used to non-visually represent data, stereo imaging can be utilized to provide another dimension to the preview. For example, in the GPS example given above, if a user is to take a right turn audio can be generated only from the right speaker, and if the user is to take a left turn audio can be generated only from the left speaker. If the user is to head straight then audio can be generated from both speakers simultaneously.

In yet another example, when an email application is launched, a string of pulses is performed. Each pulse represents an unread email in the inbox. The absence of a pulse indicates that the email was opened. A stronger pulse indicates that the email has an attachment associated therewith. Note that this example applies to a variety of lists and is not restricted to message lists. For instance, it is also applicable to a long list of images that have different properties. In another example, when an attachment is opened and being downloaded, faint pulses can be performed. The pulses can represent, for instance, the number of pages in the document. If a webpage is being loaded, pulses can represent the number of images on the webpage or even what type of page is being downloaded (a form, an image, a text, a blog, or the like). It should be noted that the modalities discussed above are interchangeable. For example, haptic feedback can be replaced with audio feedback and vice-versa. Alternatively, haptic feedback and audio feedback can be combined as well.

Figure 11:
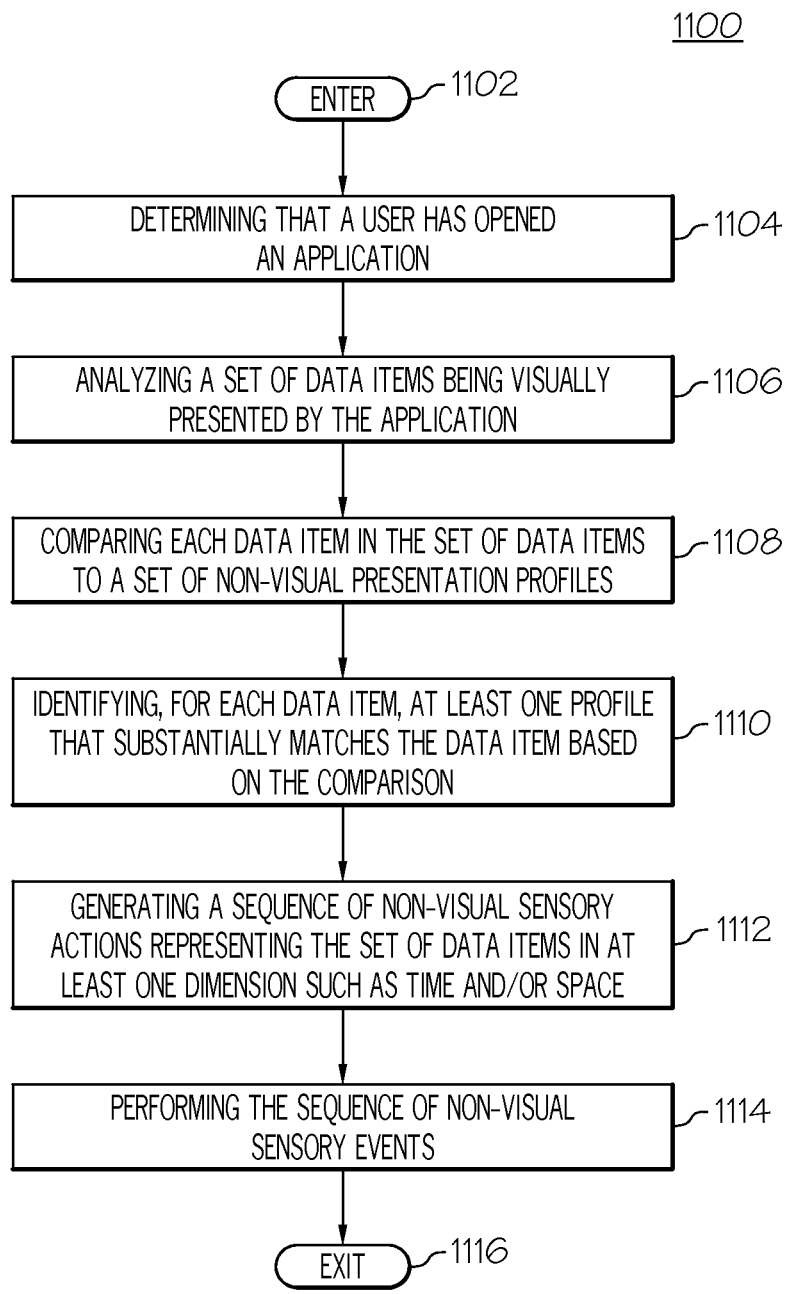
FIG. 11 is a flow diagram for a non-visual sensory based information presentation process performed by the non-visual presentation manager illustrated in FIG. 1, in accordance with one example.

FIG. 11 is a flow diagram for a non-visual sensory based information presentation process 1100. The non-visual sensory based information presentation process 1100 presents information currently being displayed on an electronic device to a user in a non-visual sensory based manner as discussed above with respect to FIGS. 1-10. This non-visual sensory based information presentation process 1100 is performed by the non-visual presentation manager 104 discussed above.

The flow diagram of FIG. 11 begins at step 1102 and flows directly to step 1104. The presentation manager 104, at step 1104, determines that a user has opened or is interacting with an application 108. The presentation manager 104, at step 1106, analyzes a set of data items 110 being visually presented by the application 108. As discussed above, this data is defined by a time and/or space dimension. The presentation manager 104, at step 1108, compares each data item in the set of data items 110 to a step of non-visual presentation profiles 112. The presentation manager 104, at step 1110, identifies, for each data item, at least one profile 112 that substantially matches the data item based on the comparison. The presentation manager 104, at step 1112, generates a sequence of non-visual sensory events that represent the set of data items in at least one dimension, such as time and/or space. The presentation manager 104, at step 1114, performs the sequence of non-visual sensory events. The control flow then exits at step 1116.

Figure 12:
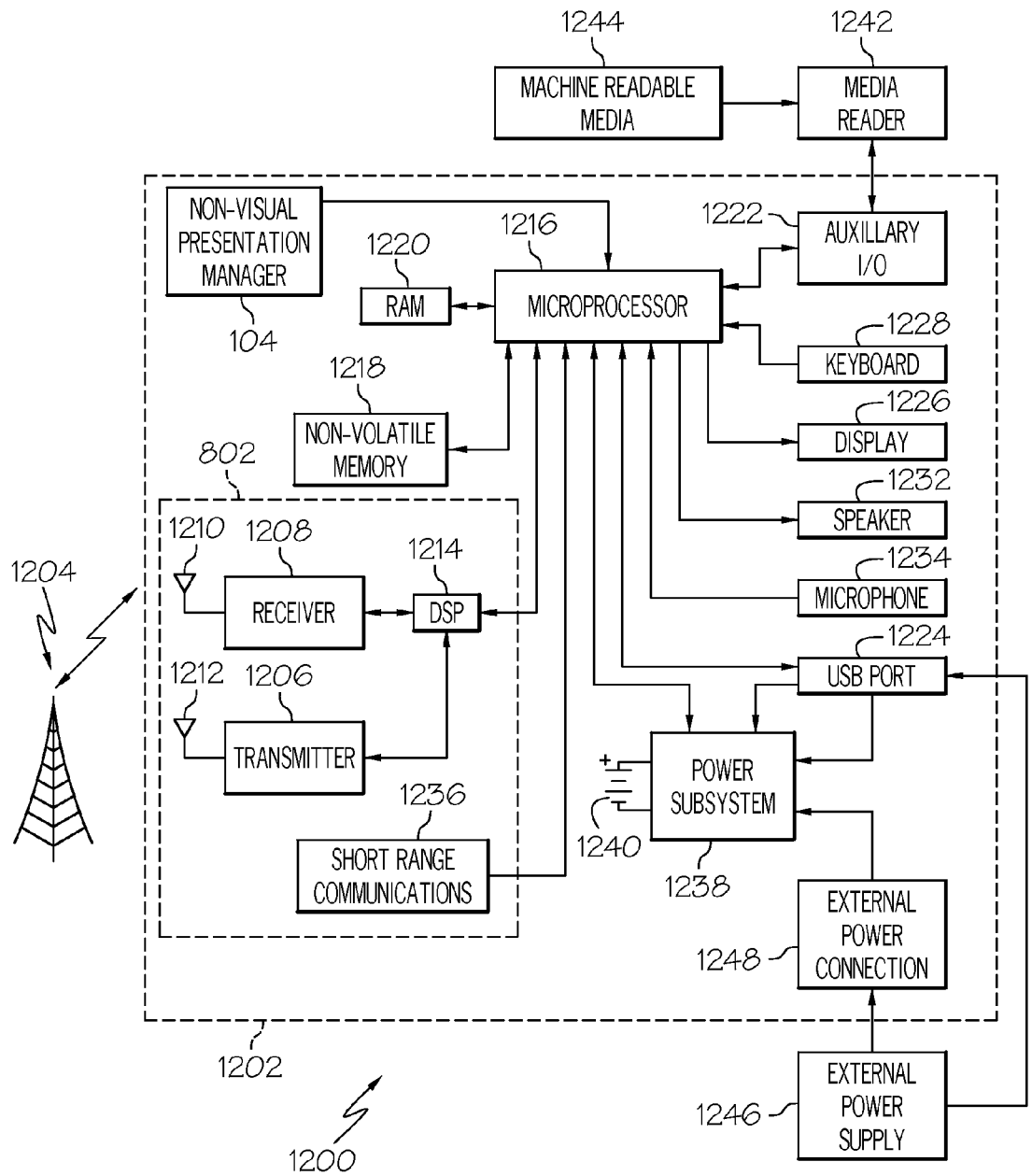
FIG. 12 is a block diagram of an electronic device and associated components in which the systems and methods disclosed herein may be implemented.

FIG. 12 is a block diagram of an electronic device and associated components 1200 in which the systems and methods disclosed herein may be implemented. In this example, an electronic device 1202 is a wireless two-way communication device with voice and data communication capabilities. Such electronic devices communicate with a wireless voice or data network 1204 using a suitable wireless communications protocol. Wireless voice communications are performed using either an analog or digital wireless communication channel. Data communications allow the electronic device 1202 to communicate with other computer systems via the Internet. Examples of electronic devices that are able to incorporate the above described systems and methods include, for example, a data messaging device, a two-way pager, a cellular telephone with data messaging capabilities, a wireless Internet appliance, a tablet computing device or a data communication device that may or may not include telephony capabilities.

The illustrated electronic device 1202 is an example electronic device that includes two-way wireless communications functions. Such electronic devices incorporate communication subsystem elements such as a wireless transmitter 1206, a wireless receiver 1208, and associated components such as one or more antenna elements 1210 and 1212. A digital signal processor (DSP) 1214 performs processing to extract data from received wireless signals and to generate signals to be transmitted. The particular design of the communication subsystem is dependent upon the communication network and associated wireless communications protocols with which the device is intended to operate.

The electronic device 1202 includes a microprocessor 1216 (that controls the overall operation of the electronic device 1202. The microprocessor 1216 interacts with the above described communications subsystem elements and also interacts with other device subsystems such as non-volatile memory 1218 and random access memory (RAM) 1220. The non-volatile memory 1218 and RAM 1220 in one example contain program memory and data memory, respectively. The microprocessor 1216 also interacts with the non-visual presentation manager 104 and its components, an auxiliary input/output (I/O) device 1222, a Universal Serial Bus (USB) Port 1224, a display 1226, a keyboard 1228, a speaker 1232, a microphone 1234, a short-range communications subsystem 1236, a power subsystem 1238, and any other device subsystems.

A battery 1240 is connected to a power subsystem 1238 to provide power to the circuits of the electronic device 1202. The power subsystem 1238 includes power distribution circuitry for providing power to the electronic device 1202 and also contains battery charging circuitry to manage recharging the battery 1240. The power subsystem 1238 includes a battery monitoring circuit that is operable to provide a status of one or more battery status indicators, such as remaining capacity, temperature, voltage, electrical current consumption, and the like, to various components of the electronic device 1202. An external power supply 1246 is able to be connected to an external power connection 1248.

The USB port 1224 further provides data communication between the electronic device 1202 and one or more external devices. Data communication through USB port 1224 enables a user to set preferences through the external device or through a software application and extends the capabilities of the device by enabling information or software exchange through direct connections between the electronic device 1202 and external data sources rather than via a wireless data communication network.

Operating system software used by the microprocessor 1216 is stored in non-volatile memory 1218. Further examples are able to use a battery backed-up RAM or other non-volatile storage data elements to store operating systems, other executable programs, or both. The operating system software, device application software, or parts thereof, are able to be temporarily loaded into volatile data storage such as RAM 1220. Data received via wireless communication signals or through wired communications are also able to be stored to RAM 1220. As an example, a computer executable program configured to perform the non-visual sensory based information presentation process 1100, described above, is included in a software module stored in non-volatile memory 1218.

The microprocessor 1216, in addition to its operating system functions, is able to execute software applications on the electronic device 1202. A predetermined set of applications that control basic device operations, including at least data and voice communication applications, is able to be installed on the electronic device 1202 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. Further applications include applications that have input cells that receive data from a user.

Further applications may also be loaded onto the electronic device 1202 through, for example, the wireless network 1204, an auxiliary I/O device 1222, USB port 1224, short-range communications subsystem 1236, or any combination of these interfaces. Such applications are then able to be installed by a user in the RAM 1220 or a non-volatile store for execution by the microprocessor 1216.

In a data communication mode, a received signal such as a text message or web page download is processed by the communication subsystem, including wireless receiver 1208 and wireless transmitter 1206, and communicated data is provided the microprocessor 1216, which is able to further process the received data for output to the display 1226, or alternatively, to an auxiliary I/O device 1222 or the USB port 1224. A user of the electronic device 1202 may also compose data items, such as e-mail messages, using the keyboard 1228, which is able to include a complete alphanumeric keyboard or a telephone-type keypad, which may be implemented as a physical keyboard or a virtual keyboard comprising key images rendered on a touchscreen display, in conjunction with the display 1226 and possibly an auxiliary I/O device 1222. Such composed items are then able to be transmitted over a communication network through the communication subsystem.

For voice communications, overall operation of the electronic device 1202 is substantially similar, except that received signals are generally provided to a speaker 1232 and signals for transmission are generally produced by a microphone 1234. Alternative voice or audio I/O subsystems, such as a voice message recording subsystem, may also be implemented on the electronic device 1202. Although voice or audio signal output is generally accomplished primarily through the speaker 1232, the display 1226 may also be used to provide an indication of the identity of a calling party, the duration of a voice call, or other voice call related information, for example.

Depending on conditions or statuses of the electronic device 1202, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1236 is a further optional component which may provide for communication between the electronic device 1202 and different systems or devices, which need not necessarily be similar devices. For example, the short-range communications subsystem 1236 may include an infrared device and associated circuits and components or a Radio Frequency based communication module such as one supporting Bluetooth® communications, to provide for communication with similarly-enabled systems and devices.

A media reader 1242 is able to be connected to an auxiliary I/O device 1222 to allow, for example, loading computer readable program code of a computer program product into the electronic device 1202 for storage into non-volatile memory 1218. In one example, computer readable program code includes instructions for performing the pressure detecting user input device operating process 1100, described above. One example of a media reader 1242 is an optical drive such as a CD/DVD drive, which may be used to store data to and read data from a computer readable medium or storage product such as computer readable storage media 1244. Examples of suitable computer readable storage media include optical storage media such as a CD or DVD, magnetic media, or any other suitable data storage device. Media reader 1242 is alternatively able to be connected to the electronic device through the USB port 1224 or computer readable program code is alternatively able to be provided to the electronic device 1202 through the wireless network 1204.

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of operating an electronic device comprising:
   accessing a list of visually representable items occurring within a total time period defined by a beginning and an end; and
   rendering, in sequence for all the items in the list specified by the total time period, a non-visual sensory overview, and based on the visual items being a set of:
   calendar entries, for each non-visual sensory overview, setting a length of the non-visual sensory overview based on a ratio defined by a length of a respective calendar entry divided by a length of the total time period;
   messages within the total time period, for each non-visual sensory overview, using a set of attributes to indicate whether each message in a set of messages has been read or unread and has an attachment associated therewith; and
   directions for turn-by-turn navigation, for each non-visual sensory overview, setting a duration until a start of the non-visual sensory overview based on a ratio defined by a distance to a start of a respective direction divided by a distance of an overall route.

2. The method of claim 1, where each non-visual sensory overview is rendered using at least one of sound, haptic feedback, temperature, electric shock, and change in a shape.

3. The method of claim 1, where the visual items being a set of calendar entries, a start time of the rendering of each non-visual sensory overview corresponds to a ratio defined by a length till a start time of a respective calendar entry divided by a length of the total time period.

4. The method of claim 1, where each of the visually representable items is placed within one of a plurality of non-visual sensory categories based on at least one non-visual presentation profile.

5. An electronic device comprising:
a memory;
a processor communicatively coupled to the memory; and
a non-visual presentation manager communicatively coupled to the memory and the processor, the non-visual presentation manager configured to perform a method comprising:
accessing a list of visually representable items occurring within a total time period defined by a beginning and an end; and
rendering, in sequence for all the items in the list specified by the total time period, a non-visual sensory overview, and based on the visual items being a set of
calendar entries, for each non-visual sensory overview, setting a length of the non-visual sensory overview based on a ratio defined by a length of a respective calendar entry divided by a length of the total time period;
messages within the total time period, for each non-visual sensory overview, using a set of attributes to indicate whether each message in a set of messages has been read or unread and has an attachment associated therewith; and
directions for turn-by-turn navigation, for each non-visual sensory overview, setting a duration until a start of the non-visual sensory overview based on a ratio defined by a distance to a start of a respective direction divided by a distance of an overall route.

6. The electronic device of claim 5, where each non-visual sensory overview is rendered using at least one of sound, haptic tactile feedback, temperature, electric shock, and change in a shape.

7. The electronic device of claim 5, where the visual items being a set of calendar entries, a start time of the rendering of each non-visual sensory overview corresponds to a ratio defined by a length till a start time of a respective calendar entry divided by a length of the total time period.

8. The electronic device of claim 5, where each of the visually representable items is placed within one of a plurality of non-visual sensory categories based on at least one non-visual presentation profile.

9. A computer program product comprising:
a non-transitory storage medium readable by a processing circuit and storing instructions for execution by the processing circuit configured to perform a method comprising:
accessing a list of visually representable items within a total time period defined by a beginning and an end; and
rendering, in sequence for all the items in the list specified by the total time period, a non-visual sensory overview, and based on the visual items being a set of
calendar entries, for each non-visual sensory overview, setting a length of the non-visual sensory overview based on a ratio defined by a length of a respective calendar entry divided by a length of the total time period;
messages within the total time period, for each non-visual sensory overview, using a set of attributes to indicate whether each message in a set of messages has been read or unread and has an attachment associated therewith; and
directions for turn-by-turn navigation, for each non-visual sensory overview, setting a duration until a start of the non-visual sensory overview based on a ratio defined by a distance to a start of a respective direction divided by a distance of an overall route.

10. The computer program product of claim 9, where each non-visual sensory overview is rendered by an electronic device using at least one of sound, haptic feedback, temperature, electric shock, and change in a shape.

11. The computer program product of claim 9, where the visual items being a set of calendar entries, a start time of the rendering of each non-visual sensory overview corresponds to a ratio defined by a length till a start time of a respective calendar entry divided by a length of the total time period.

12. The computer program product of claim 9, where each of the visually representable items is placed within one of a plurality of non-visual sensory categories based on at least one non-visual presentation profile.

13. A method of operating an electronic device comprising:
accessing a list of visually representable items within a total display space defined by a beginning and an end; and
rendering, in sequence for all the items in the list specified by the total display space, a non-visual sensory overview, and based on the visual items being a set of
calendar entries, for each non-visual sensory overview, setting a length of the non-visual sensory overview based on a ratio defined by a spatial length of a respective calendar entry divided by a spatial length of the total display space;
messages within the total display space, for each non-visual sensory overview, using a set of attributes to indicate whether each message in a set of messages has been read or unread and has an attachment associated therewith; and
directions for turn-by-turn navigation, for each non-visual sensory overview, setting a duration until a start of the non-visual sensory overview based on a ratio defined by a spatial length till a start of a respective direction divided by a spatial length of an overall route.

14. The method of claim 13, where a start of each non-visual sensory overview corresponds to a position of each visual item within a scrollable window.

* * * * *